US009432564B2

(12) United States Patent
Nurmenniemi

(10) Patent No.: US 9,432,564 B2
(45) Date of Patent: Aug. 30, 2016

(54) METHOD AND APPARATUS FOR TAGGING INFORMATION BASED ON CONTEXTUAL CRITERIA

(75) Inventor: Marko Kullervo Nurmenniemi, Espoo (FI)

(73) Assignee: NOKIA CORPORATION, Espoo (FI)

( * ) Notice: Subject to any disclaimer, the term of this patent is extended or adjusted under 35 U.S.C. 154(b) by 236 days.

(21) Appl. No.: 14/130,278

(22) PCT Filed: Jun. 30, 2011

(86) PCT No.: PCT/CN2011/076666
§ 371 (c)(1),
(2), (4) Date: Mar. 28, 2014

(87) PCT Pub. No.: WO2013/000153
PCT Pub. Date: Jan. 3, 2013

(65) Prior Publication Data
US 2014/0226035 A1 Aug. 14, 2014

(51) Int. Cl.
| | |
|---|---|
| *H04N 5/76* | (2006.01) |
| *H04N 5/232* | (2006.01) |
| *G08B 13/196* | (2006.01) |
| *G06F 17/30* | (2006.01) |
| *H04N 9/82* | (2006.01) |
| *H04N 5/228* | (2006.01) |

(52) U.S. Cl.
CPC .......... *H04N 5/232* (2013.01); *G06F 17/3082* (2013.01); *G06F 17/30268* (2013.01); *G08B 13/19671* (2013.01); *H04N 5/76* (2013.01); *H04N 9/8205* (2013.01)

(58) Field of Classification Search
CPC .............. H04N 5/232; G06F 17/3082; G06F 17/30268; G08B 13/19671
USPC ........................................... 348/231.2–231.3
See application file for complete search history.

(56) References Cited

U.S. PATENT DOCUMENTS

| | | | | |
|---|---|---|---|---|
| 8,285,084 | B2* | 10/2012 | Yoda ................. | G06F 17/30247 358/1.15 |
| 8,520,909 | B2* | 8/2013 | Leung ............... | G06F 17/30247 382/118 |
| 8,860,587 | B2* | 10/2014 | Nordstrom ............. | G08G 1/202 340/990 |
| 9,037,583 | B2* | 5/2015 | Nitesh ............... | G06F 17/30265 707/736 |
| 9,191,693 | B2* | 11/2015 | Igarashi ................. | G01C 21/32 |
| 2006/0069681 | A1* | 3/2006 | Lauper .............. | G06F 17/30265 |
| 2007/0118508 | A1 | 5/2007 | Svendsen | |
| 2007/0127833 | A1* | 6/2007 | Singh ................ | G06F 17/30265 382/254 |
| 2009/0089322 | A1* | 4/2009 | Naaman ............. | G06F 17/30038 |
| 2011/0157218 | A1* | 6/2011 | Ptucha .................... | G06T 11/60 345/619 |
| 2012/0190404 | A1* | 7/2012 | Rhoads ............. | G06F 17/30265 455/556.1 |

OTHER PUBLICATIONS

International Search Report for corresponding Application No. PCT/CN2011/076666, date of mailing Apr. 5, 2012, 2 pages.

* cited by examiner

*Primary Examiner* — Ngoc-Yen Vu
(74) *Attorney, Agent, or Firm* — Ditthavong & Steiner, P.C.

(57) ABSTRACT

An approach is provided for tagging information based on contextual criteria. A tagging platform determines at least one criteria for associating information acquired by a device with at least one tag. The tagging platform also processes and/or facilitates a processing of context information of the device, a user of the device, or a combination thereof to determine a state of the at least one criteria. The tagging platform further causes, at least in part, an association of the at least one tag with the information based, at least in part, on the state of the at least one criteria. Such an approach allows for configuring the tagging of information prior to or upon initially acquiring the information.

20 Claims, 15 Drawing Sheets

METHOD AND APPARATUS FOR TAGGING INFORMATION BASED ON CONTEXTUAL CRITERIA

BACKGROUND

Service providers and device manufacturers (e.g., wireless, cellular, etc.) are continually challenged to deliver value and convenience to consumers by, for example, providing compelling network services. As device manufacturers are constantly improving the capabilities of the devices, such new capabilities include acquiring vast amounts of information, such as images, audio recordings, multimedia recordings, etc. For some devices, the image acquisition rivals some of the most expensive cameras, which allows consumers to carry a single, mobile device, rather than a mobile device and a standalone camera. However, consumers face problems associated with the ability to acquire large amounts of information in the form of images, audio recordings, and multimedia recordings—particularly with respect to tagging and organizing the information. Currently, tagging the information occurs after acquiring the information according to a "shoot and sort" approach. This requires the user of the device to remember the point in time, location, etc. of when the information was acquired to be able to tag the information at a later time. With the large amounts of storage space included in modern devices, remembering the tagging information for all of the acquired information can be burdensome and/or distracting from enjoying the situation in which the information is acquired. As such, service providers and device manufacturers face considerable challenges in providing mechanisms and services that allow consumers to tag information acquired by mobile devices in an efficient and simple manner.

Some Example Embodiments

Therefore, there is a need for an approach for tagging information based on contextual criteria.

According to one embodiment, a method comprises determining at least one criteria for associating information acquired by a device with at least one tag. The method also comprises processing and/or facilitating a processing of context information of the device, a user of the device, or a combination thereof to determine a state of the at least one criteria. The method further comprises causing, at least in part, an association of the at least one tag with the information based, at least in part, on the state of the at least one criteria.

According to another embodiment, an apparatus comprises at least one processor, and at least one memory including computer program code for one or more computer programs, the at least one memory and the computer program code configured to, with the at least one processor, cause, at least in part, the apparatus to determine at least one criteria for associating information acquired by a device with at least one tag. The apparatus is also caused to process and/or facilitate a processing of context information of the device, a user of the device, or a combination thereof to determine a state of the at least one criteria. The apparatus is further caused, at least in part, to associate the at least one tag with the information based, at least in part, on the state of the at least one criteria.

According to another embodiment, a computer-readable storage medium carries one or more sequences of one or more instructions which, when executed by one or more processors, cause, at least in part, an apparatus to determine at least one criteria for associating information acquired by a device with at least one tag. The apparatus is also caused to process and/or facilitate a processing of context information of the device, a user of the device, or a combination thereof to determine a state of the at least one criteria. The apparatus is further caused, at least in part, to associate the at least one tag with the information based, at least in part, on the state of the at least one criteria.

According to another embodiment, an apparatus comprises means for determining at least one criteria for associating information acquired by a device with at least one tag. The apparatus also comprises means for processing and/or facilitating a processing of context information of the device, a user of the device, or a combination thereof to determine a state of the at least one criteria. The apparatus further comprises means for causing, at least in part, an association of the at least one tag with the information based, at least in part, on the state of the at least one criteria.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-24 and 42-44.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for tagging information based on contextual criteria are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
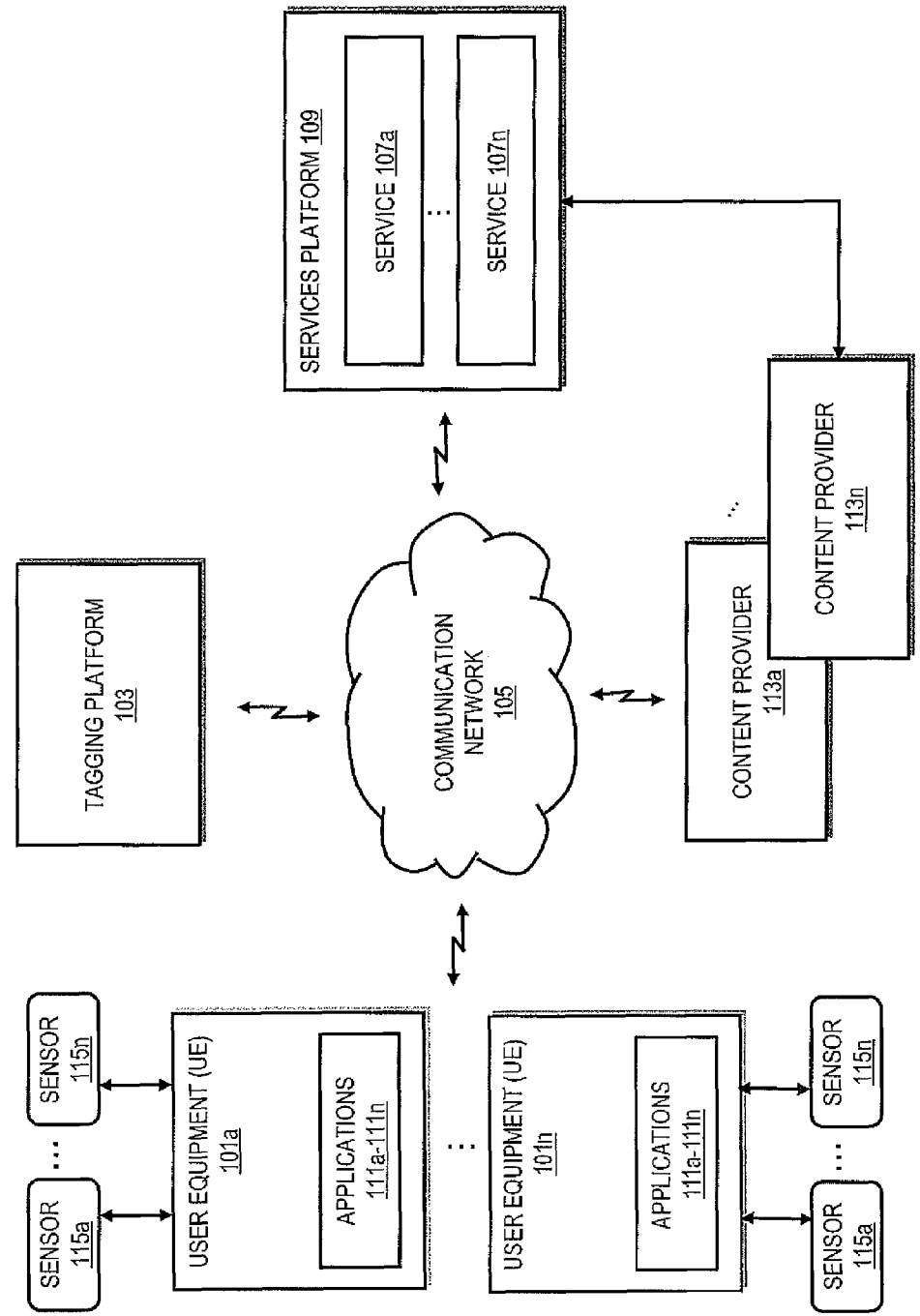
FIG. 1 is a diagram of a system capable of tagging information based on contextual criteria, according to one embodiment.

FIG. 1 is a diagram of a system capable of tagging information based on contextual criteria, according to one embodiment. As discussed above, devices have the ability to acquire vast amounts of information in the form of, for example, images, audio recordings, multimedia recordings, etc. Users of the devices have the ability to tag the information after acquiring the information according to a "shoot and sort" approach. This approach is burdensome for the users for several reasons. For one reason, if the users acquire a large amount of information over time, the users must remember, for example, when the information was acquired, where the information was acquired, etc. to tag the information properly. With a large amount of information acquired over a large amount of time, remembering the where and when can be difficult. For another, related reason, to avoid having to go back and tag the vast amounts of acquired information, the users can periodically tag the information after acquiring the information. However, tagging the information periodically can be difficult. For example, users may not understand how to tag individual images acquired by a camera on their mobile devices. Additionally, tagging individual images immediately after acquiring the images may be prohibitively burdensome. For example, to tag an acquired image, users often must exit the camera application on the mobile device, or navigate to a different section of the camera application, to add tags to acquired images one by one. This can be time consuming to the point where the users would rather enjoy the primary task and worry about tagging the images later—resulting in having to tag a large number of images.

To address this problem, a system 100 of FIG. 1 introduces the capability to tag information based on contextual criteria and setup such a configuration prior to acquiring the information. Such a capability allows a user to acquire a vast amount of information while focusing on a primary task, such as taking pictures and/or enjoying a vacation, while automatically tagging the information according to one or more tags based on one or more criteria.

In one embodiment, upon accessing a function on a device that acquires information, or upon initially acquiring information, the system 100 prompts the user of the device to enter at least one tag, at least one criteria, or a combination thereof. Upon entering the tag and the criteria, the system 100 associates the tag with the acquired information based on a state of the criteria. Thus, the system 100 allows the user to setup, for example, a tag configuration rule based on the criteria, and allows the user to enjoy the primary task of, for example, sightseeing vacation while the system 100 tags the acquired information based on the tag and the state of the criteria.

By way of example, upon a user accessing a camera application on a mobile device, the camera application prompts the user for at least one tag that will be used to tag the images acquired by the camera application. The user can enter a tag such as, "Bryan's Birthday 2011." The camera application also prompts the user for at least one criteria, the state of which is used to determine whether to associate the tag with the acquired information. The user can enter criteria such as a span of time between 1:00 to 4:00 PM, representing the time of a party. Upon acquiring an image, the system 100 determines a state of the criteria based on the context information of the device, the user of the device, or a combination thereof. For example, upon acquiring an image, the system 100 determines whether the current time is between 1:00 and 4:00 PM. When, for example, the state of the criteria is satisfied (e.g., between 1:00 and 4:00 PM), the system 100 associates the tag with the acquired information. When the state of the criteria is not satisfied (e.g., not between 1:00 and 4:00 PM), the system 100 does not associate the tag with the acquired information. In other words, prior to 1:00 PM, the system 100 does nothing upon receiving acquired information. Upon the current time reaching 1:00 PM, the system initiates an association of acquired information with the set tag "Bryan's Birthday 2011." Upon the current time reaching after 4:00 PM, the system 100 terminates the association of any information acquired after 4:00 PM with the set tag.

In one embodiment, the system 100 handles multiple tags associated with multiple different criteria. Thus, the system 100 will associate some tags with acquired information and not associate other tags with the acquired information depending on the state of multiple criteria. By way of example, a first tag can be "Family Trip to China" that corresponds to a first criteria of anytime between March 30 to Apr. 15, 2011 (e.g., when the family will be on vacation in China). A second tag can be "Great Wall of China" that corresponds to a second criteria of any location within 100 yards of the Great Wall of China that is determined based on a navigation application running on the user's device that acquires the image. Based on the set tags and the criteria, upon acquiring information within the above time span (e.g., a state of the first criteria is satisfied), the information is tagged with the tag "Family Trip to China." If, during the time span, the device is within 100 yards of the Great Wall of China (e.g., a state of the second criteria is satisfied), the information is also tagged with the tag "Great Wall of China."

In one embodiment, the system 100 determines and/or suggests the at least one tag, the at least one criteria, or a combination thereof based, at least in part, on the context information. By way of example, upon executing a camera application on a device, the system 100 determines the context information of the device. Upon determining the context information of the device, the system learns, for example, that the device is near the Great Wall of China. Thus, the device automatically determines to set the tag for acquired information according to, "Great Wall of China," and sets the criteria according to a location of within 100 yards of Great Wall of China.

In one embodiment, the system 100 allows for a user of a device to share the at least one tag, the at least on criteria, or a combination thereof with another user of another device. The tag and the criteria can be shared by SMS, MMS, email, peer-to-peer (P2P), etc. The tag also can be shared by sharing an image, sound recording, multimedia recording, or other type of information that already includes a tag. For example, one user tags an image with the tag "Family Vacation" and shares the image with another member on the same vacation. Because the shared image includes the tag, the system 100 can extract the tag from the shared image and tag acquired information according to the same tag.

As shown in FIG. 1, the system 100 includes one or more user equipment (UE) 101a-101n (collectively referred to as UE 101) having connectivity to a tagging platform 103 via a communication network 105. The UE 101 may execute one or more applications 111a-111n (collectively referred to as applications 111) that perform one or more functions. By way of example, the one or more applications 111 include messaging applications, calendar applications, context applications, sensor applications, mapping/navigation applications, social networking applications, organizational applications, audio/visual acquiring applications, etc. One or more of the applications 111 can interface with the tagging platform 103 for tagging information acquired by the UE 101 based on criteria of the UE 101 and/or the user of the UE 101.

The UE 101 also include one or more sensors 115a-115n (collectively referred to as sensors 115). The sensors 115 collect context information associated with the device, the user of the device, or a combination thereof. The sensors may include image sensors, audio sensors, location sensors (e.g., GPS, triangulation, etc.), accelerometers, gyroscopes, brightness sensors, moisture sensors, load sensors, slope sensors, visibility sensors, etc. The sensors 115 can interface with the UE 101, the applications 111, and the tagging platform 103 for receiving and transmitting context information regarding the UE 101 and/or the user of the UE 101. The UE 101 acquire information, such as images, audio recordings, multimedia recordings, etc. through the sensors and the information is tagged by the tagging platform. By way of example, a user of the UE 101 uses an image sensor to capture an image of the Great Wall of China. Based on the state of a set criteria, the acquired image is tagged with the set tag "Great Wall of China."

The system 100 also includes a services platform 109 that includes one or more services 107a-107n (collectively referred to as services 107). The services platform 109 provides one or more of the services 107 to the UE 101 and the tagging platform 103. The services 107 can include messaging services, calendar services, context information services, sensor services, mapping/navigation services, social networking services, organizational services, audio/visual services, etc.

The system 100 also includes one or more content providers 113a-113n (collectively referred to as content providers 113) that provide content to the UE 101, the tagging platform 103 and the services platform 109. The content providers 113 can provide messaging content, calendar content, context information content, sensor content, mapping/navigation content, social networking content, organizational content, audio/visual content, etc.

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the UE 101, the tagging platform 103, the services platform 109, and the content providers 113 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
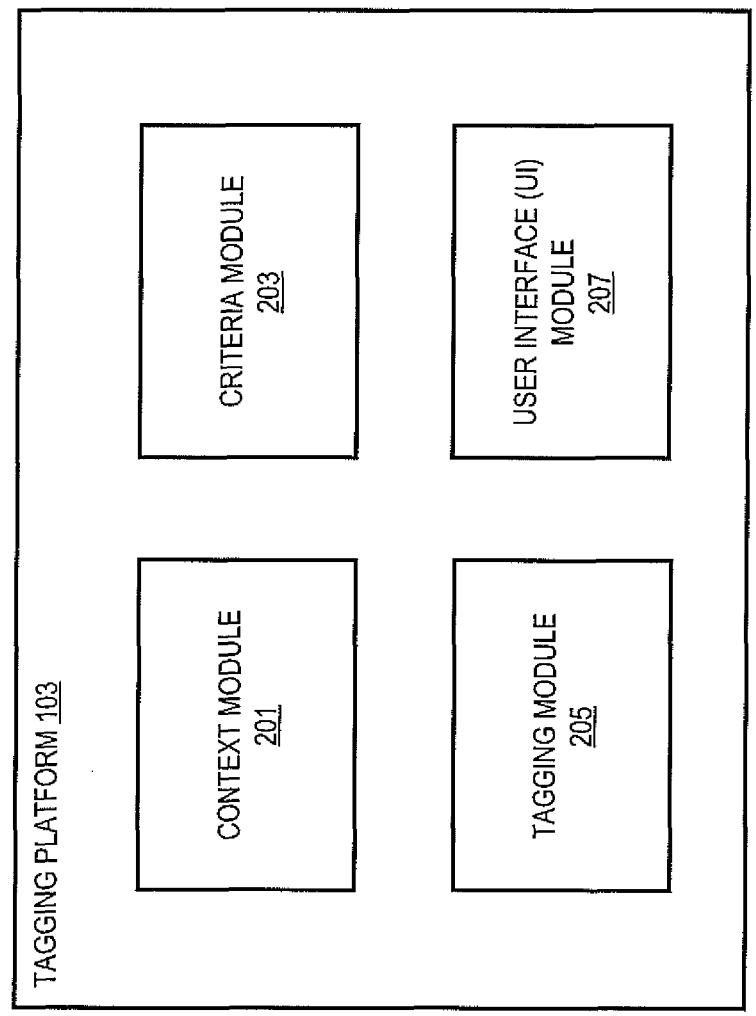
FIG. 2 is a diagram of the components of a tagging platform, according to one embodiment.

FIG. 2 is a diagram of the components of the tagging platform 103, according to one embodiment. By way of example, the tagging platform 103 includes one or more components for providing tagging information based on contextual criteria. It is contemplated that the functions of these components may be combined in one or more components or performed by other components of equivalent functionality. By way of example, the functions of these components may be combined in one or more applications 111 running on the UE 101, one or more services 107 running on the services platform 109, and/or one or more content providers 113. In this embodiment, the tagging platform 103 includes a context module 201, a criteria module 203, a tagging module 205 and a user interface module 207.

The context module 201 determines the context information of the UE 101, the user of the UE 101, or the combination thereof. The context module 201 determines the context information based on one or more applications 111 running on the UE 101, one or more of the sensors 115 associated with the UE 101, one or more of the services 107 running on the services platform 109, and/or one or more of the content providers 113. The context information can comprise any information regarding the past, present or future context of the UE 101 and/or the user of the UE 101. By way of example, the context information can include, a location of the UE 101, an elevation of the UE 101, the current time, the current date, an appointment (e.g., within a calendar application 111) associated with the user of the UE 101, whether the UE 101 is moving (e.g., from a motion sensor 115), whether the UE 101 is providing an active navigation route (e.g., by a navigation application 111), etc. The context module 201 determines the context information of the user of the UE 101 and/or the UE 101 to determine the state of one or more criteria set at the tagging platform 103.

The criteria module 203 determines the criteria set by the user of the UE 101, the UE 101 itself based on, for example, the context information, or a combination thereof. The criteria includes one or more contexts of the UE 101 and/or the user of UE 101 that are satisfied or not based on the past, present or future context information of the UE 101 and/or the user of the UE 101. The set criteria can constitute any criteria related to the context information. Thus, the criteria can be based on a location, an elevation, a time, an activity (e.g., based on a speed or a route, for example driving a car, riding a bus, flying in a plane, taking a cruise), etc. The criteria module accepts more than one criteria based on more than one type of context. For example, one set criteria may be based on a location and set another criteria may be based on time.

By way of example, the criteria set by the user may constitute a five mile radius around the current position. The criteria could also include a length of time of two hours starting from the current time. Thus, the tagging platform 103 compares the set criteria to the context information to determine whether the UE 101 is within five miles of the current position (e.g., the position at the point of setting the criteria) and whether the current time is within the two hour length of time starting from the current time (e.g., the current time as of setting the criteria). In one embodiment, when the context information satisfies both the location and the time criteria, the state of the criteria is satisfied. In one embodiment, when the context information does not satisfy either one of the location and the time criteria, the state of the criteria is not satisfied. In one embodiment, only when the context information does not satisfy both the location and the time criteria, the state of the criteria is not satisfied. When the context information satisfies one of the location and the time criteria, the state of the criteria, as a whole, is partially satisfied.

The criteria module 203 also can include one or more preset criteria that correspond to context information that the tagging platform 103 automatically determines, pre-selects and/or suggests as the criteria based on the content information. The context information that corresponds to preset criteria can be based on a specific location, a specific elevation, a specific date and/or time, etc. For example, a detection of context information of a certain elevation (e.g., above 30,000 feet if the user of the UE 101 is currently traveling in a plane) can correspond to the tagging platform 103 setting or suggesting a criteria based on elevation (e.g., at least 30,000 feet). A detection of context information of a certain location (e.g., near a landmark, within a city's limits, on an island, on the ocean, set coordinates, etc.) can correspond to the tagging platform 103 setting or suggesting a criteria based on the location (e.g., within five miles of the landmark, within the city's limits, the perimeter of the island, within 100 miles of the current location on the ocean, etc.).

The tagging module 205 determines the one or more tags set by the user of the UE 101, associates the one or more tags to the acquired information, and suggests and/or pre-selects one or more tags based on the context information. The tagging module 205 determines the one or more tags set by the user based on the user's interactions with the UE 101. By way of example, the user enters text corresponding to the desired tag using a user interface of the UE 101. The user could also enter preset tags corresponding to preset context information. By way of example, the user could configure the tagging module 205 to associate the tag "Christmas" with the day of any year corresponding to December 25. In one embodiment, the tagging module 205 is already configured to associate preset tags with preset context information. By way of example, the tagging module 205 is preset to associate the tag "Christmas" with the day of any year corresponding to December 25. The tagging module could also be preset to associate a location, such as the Great Wall of China, with a tag corresponding to the location (e.g., "Trip to the Great Wall of China"). In one embodiment, the tagging module 205 automatically configures the tags based on preset tags corresponding to preset context information. In one embodiment, the tagging module 205 automatically suggests and/or pre-selects the tags based on the preset tags corresponding to the present context information. The tagging module 205 can suggest the tags regardless of whether the user of the UE 101 has already set the tag or not. Upon determining a tag, the tagging module 205 associates the tag with the acquired information based on the state of the criteria in view of the context information. By way of example, if the state of the criteria is satisfied, the tagging module 205 associates the acquired information with the set tag. If the state of the criteria is not satisfied, the tagging module 205 does not associate the acquired information with the set tag.

The user interface (UI) module 207 initializes the user interface at the UE 101 for interfacing with the tagging platform 103. By way of example, the UI module 207 initializes the interface for entering the at least one tag and the at least one criteria. In one embodiment, a user can select the criteria based on a perimeter drawn on a map of the surrounding area. In this example, the UI module 207 causes a display of a map of the surrounding area and allows the user of the UE 101 to draw or trace an outline of the area of the criteria. Alternatively, the UI module 207 can interface with one or more mapping application 111 running on the UE 101 to provide the map of the surrounding area. The UI module 207 also provides one or more alerts or notices of suggested tags and/or criteria, and tags and/or criteria that are automatically set based on the context information.

Figure 3:
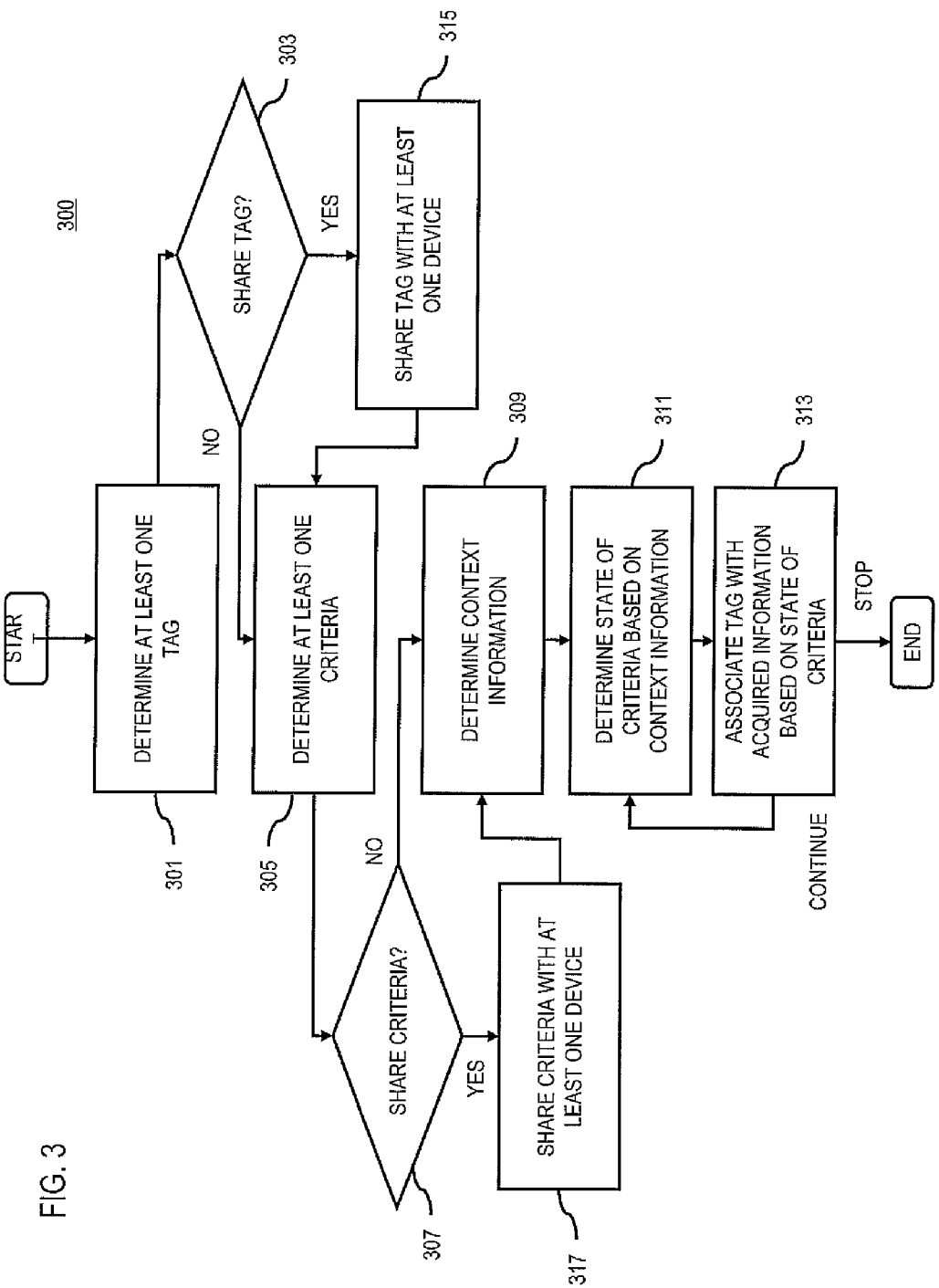
FIG. 3 is a flowchart of a process for tagging information based on contextual criteria, according to one embodiment.
Figure 7:
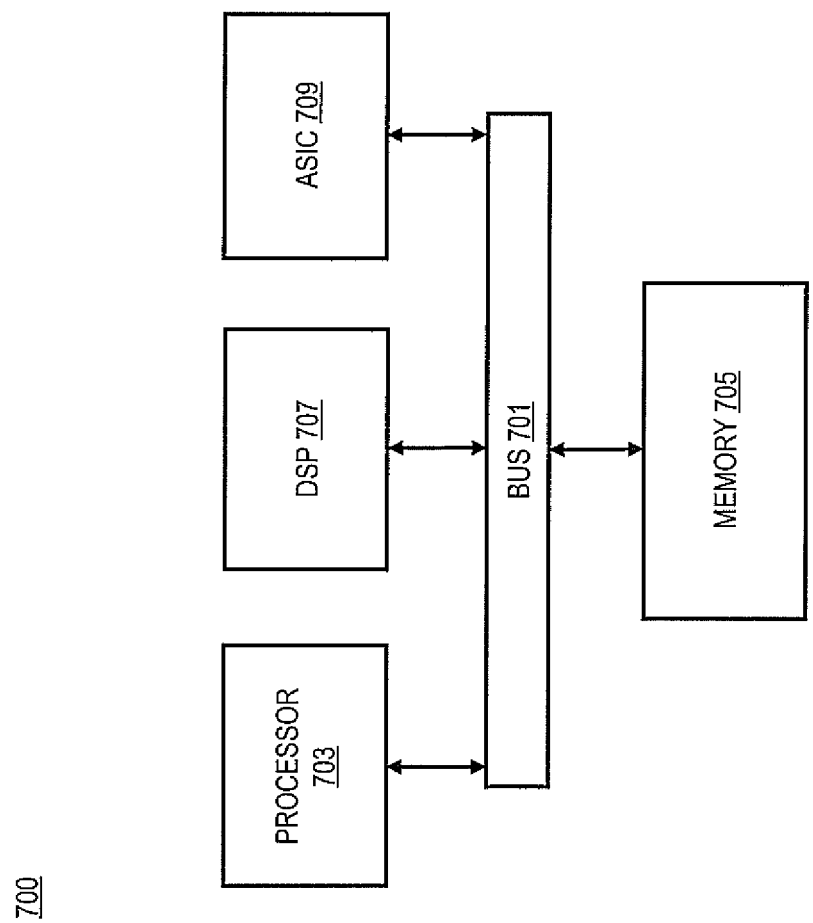
FIG. 7 is a diagram of a chipset that can be used to implement an embodiment of the invention.

FIG. 3 is a flowchart of a process for tagging information based on contextual criteria, according to one embodiment. In one embodiment, the tagging platform 103 performs the process 300 and is implemented in, for instance, a chipset including a processor and a memory as shown in FIG. 7. In step 301, the tagging platform 103 determines at least one tag to associate with the acquired information. As discussed above, the at least one tag can be set by the user of the UE 101, can be automatically set by the tagging platform 103 based on the context information of the UE 101, the user of the UE 101, or a combination thereof, can be automatically pre-selected by the tagging platform 103 based on the context information of the UE 101, the user of the UE 101, or a combination thereof, or can be a user-selected tag based on a suggestion of a tag by the tagging platform 103. Upon determining the tag, the process 300 proceeds to step 303. By way of example, the user selects a tag of "Bryan's Birthday."

At step 303, the tagging platform 103 determines whether the user of the UE 101 would like to share the set tag with another user of another UE 101. Although step 303 is illustrated as coming after step 301 in the process flow diagram of FIG. 3, the determination of whether to share the set tag can occur at any point in the process 300. If the user would like to share the set tag, the process 300 proceeds to step 315. If the user would not like to share the set tag, the process 300 proceeds to step 305.

At step 315, the tagging platform 103 shares the set tag with another user's UE 101. As discussed above, the set tag can be shared by any communication method between two UE 101 of the system 100, such as over the communication network 105 by way of SMS, MMS, email, peer-to-peer (P2P), etc. The tag also can be shared by sharing an image, sound recording, multimedia recording, or other type of information that already includes a tag.

At step 305, the tagging platform 103 determines at least one criteria, the state of which determines whether to associate the set tag with the acquired information. As discussed above, the at least one criteria can be set by the user of the UE 101, can be automatically set by the tagging platform 103, can be pre-selected by the tagging platform 103, or can be user-selected criteria based on a suggestion of criteria by the tagging platform 103. Upon determining the criteria, the process 300 proceeds to step 307. By way of example, the criteria can be set to a time span of 1:00 PM to 4:00 PM corresponding to the time of Bryan's birthday party.

In one embodiment, steps 301 and 303 occur when a user accesses an application 111 running on the UE 101 that acquires information, such as a camera application or a video recorder application. Prior to acquiring any information, the application 111 interfaces with the tagging platform 103 to determine the at least one tag and the at least one criteria. In one embodiment, steps 301 and 303 occur after a user accesses an application 111 running on the UE 101 that acquires information and after initially acquiring information. By way of example, a user acquires a first image using a camera application. After acquiring the first image, the camera application interfaces with the tagging platform 103, which prompts the user of the UE 101 for the at least one tag and the at least one criteria.

At step 307, the tagging platform 103 determines whether the user of the UE 101 would like to share the set criteria with another user of another UE 101. Although step 307 is illustrated as coming after step 305 in the process flow diagram of FIG. 3, the determination of whether to share the set criteria can occur at any point in the process 300. If the user would like to share the set criteria, the process 300 proceeds to step 317. If the user would not like to share the set criteria, the process 300 proceeds to step 309.

At step 317, the tagging platform 103 shares the set tag with another user's UE 101. As discussed above, the set criteria can be shared by any communication method between two UE 101 of the system 100, such as over the communication network 105 by way of SMS, MMS, email, peer-to-peer (P2P), etc.

At step 309, the tagging platform 103 determines the context information of the UE 101 and/or the user of the UE 101. As discussed above, the tagging platform 103 determines the context information of the user of the UE 101 and/or the UE 101 based on one or more applications 111 running on the UE 101, one or more sensors 115 associated with the UE 101 and/or one or more services 107 on the services platform 109. The context information can comprise a location (e.g., a point, an area around a point, a geographic landmark, a man-made landmark, an area or perimeter around any of the foregoing, etc.), an elevation, a time (e.g., current time, time span, etc.), or any other transient information that can be measured by the UE 101, the sensors 115, the services 107, or a combination thereof. After step 309, the process 300 proceeds to step 311.

At step 311, the tagging platform processes the context information to determine the state of the at least one criteria. The state of the at least one criteria can be satisfied, partially satisfied, or not satisfied. By way of example, if the set criteria constitutes a geographic area defined by a five mile radius around a geographic point, the state of the criteria is either satisfied by, for example, the UE 101 being within the geographic area, or not satisfied by, for example, the UE 101 not being within the geographic area. The criteria could also include a span of time, such as four hours (e.g., from the current time as of setting the criteria to four hours into the future). Accordingly, the state of the criteria is either satisfied by, for example, the UE 101 being within the geographic area and the current time being within the time span, or not satisfied by, for example, the UE 101 not being within the geographic area or the current time not being within the time span. Alternatively, the state of the criteria can be partially satisfied based on, for example, the UE 101 being within the geographic area or the current time being within the time span and the current time not being within the time span or the UE 101 not being within the geographic area, respectively. Thus, allowing for partially satisfied states allows the tagging platform 103 to be compatible with more than just two states. By way of example, one criteria associated with one tag can be satisfied while another criteria associated with another tag is not satisfied. After step 311, the process 300 proceeds to step 313.

At step 313, the tagging platform 103 associates the set tag with the acquired information based on the state of the criteria. By way of example, where the state of the criteria is satisfied, the tagging platform 103 associates the tag with the acquired information. Where the state of the criteria is not satisfied, the tagging platform 103 does not associate the tag with the acquired information. By way of example, where a time span in the future is used as the criteria, prior to and after the time span the criteria are no met. Thus, any information that is acquired not within the time span is not associated with the tag associated with the criteria. Rather, the information is associated with a default tag or with no tag. However, when the information is acquired is within the time span, the acquired information is associated with the tag.

In one embodiment, where there are more than one tag that are paired with different criteria, the tagging platform 103 associates the specific tags with the acquired information based on the state of the specific criteria. By way of example, a first tag of "Trip to Chicago" is associated with the first criteria of the city limit of Chicago, Ill. Further, a second tag of "Lake Michigan" is associated with the second criteria of within 100 yards of Lake Michigan. Accordingly, any information acquired prior to traveling to Chicago or Lake Michigan is not associated with either tag. However, upon reaching the city limit of Chicago, regardless of the location of the UE 101 relative to Lake Michigan, any information acquired will be associated with the first tag of "Trip to Chicago." Upon reaching within 100 yards of Lake Michigan, any information acquired will be associated with both tags because both criteria are satisfied. Based on the ability to set multiple different tags corresponding to different criteria, a user of the tagging platform 103 can have as generic or as specific tagging of acquired information as desired. After step 313, the process 300 repeats steps 311 and 313 to keep associating the tag with the acquired information as long as the criteria is satisfied and as long as information is acquired. In one embodiment, the process 300 ends once the user of the UE 101 exits the application 111 that initially interfaced with the tagging platform 103. In one embodiment, the process 300 ends once previously satisfied criteria is no longer satisfied (e.g., after a time span is over, after the UE 101 is no longer in a location, etc.).

Figure 4:
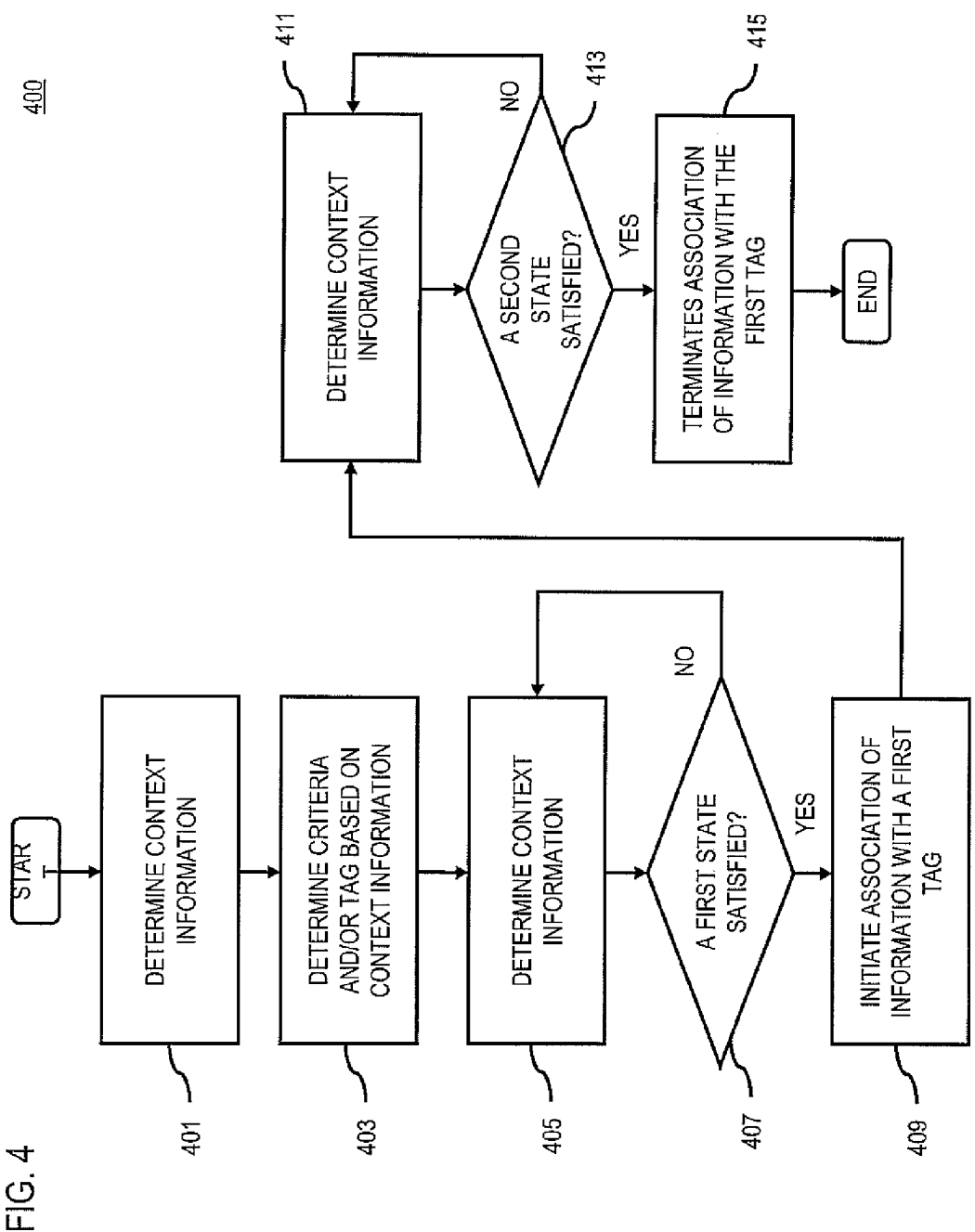
FIG. 4 is a flowchart of a process for associating a tag with information, according to one embodiment.

FIG. 4 is a flowchart of a process for associating a tag with information, according to one embodiment. In one embodiment, the tagging platform 103 performs the process 400 and is implemented in, for instance, a chipset including a processor and a memory as shown in FIG. 7. In step 401, the tagging platform 103 determines the context information of the user of the UE 101, the UE 101, or a combination thereof as discussed above.

In step 403, the tagging platform 103 determines at least one tag, at least one criteria, or a combination thereof based on the context information. As discussed above, based on an indication that the UE 101 is within a certain distance from, for example, a landmark, the tagging platform 103 can determine to set the tag based on the specific landmark. The tagging platform 103 can also determine to set the criteria based on the specific landmark, such as a distance of one mile from the landmark. Accordingly, based on steps 401 and 403, a user of the UE 101 that accesses the tagging platform 103 can simply select one or more tags and/or criteria suggested by the tagging platform 103. However, in one embodiment, steps 401 and 403 do not occur if, for example, the user of the UE 101 configures the tagging platform 103 to not suggest tags and/or criteria based on the context information. In which case, steps 401 and 403 can be replaced with, for example, steps 301 and 305 from the process 300.

As discussed above, the suggested tags may correspond to two tags and respectively correspond to different criteria. By way of example, the suggested tags can include two tags such as "First Half" and "Second Half" if the context information indicates that the user of the UE 101 is attending a sporting event based on the general time and location of the UE 101. The suggested criteria, corresponding to the above-two tags could be a start time and end time for the first half and a start time and an end time for the second half.

In step 405, the tagging platform 103 again determines the context information of the user of the UE 101, the UE 101, or a combination thereof, as discussed above. At step 407, the tagging platform 103 determines the state of the criteria based on the context information acquired at step 405. If a first state of the criteria is satisfied, the process 400 proceeds to step 409. If the first sate of the criteria is not satisfied, the process 400 reverts back to step 405 and continues determining the context information.

At step 409, the tagging platform 103 initiates an association of the information acquired by the UE 101 with a first tag based on a first state of the criteria being satisfied. By way of example, if the criteria is a time span, such as between 1:00 PM and 4:00 PM, a first state of the criteria would be a time between and including 1:00 PM to 4:00 PM. Thus, once the current time becomes 1:00 PM, the first state of the criteria is satisfied and the tagging platform 103 initiates an association of information acquired by the UE 101 with, for example, a first tag. An example of the first tag could be "Birthday Party" because the user of the UE 101 is going to be at a birthday party between 1:00 PM to 4:00 PM. Thus, any information that is acquired (e.g., images, audio recordings, multimedia recordings, etc.) is associated with the tag "Birthday Party" upon the first state of the criteria being satisfied. After step 409, the process 400 proceeds to step 411.

At step 411, the tagging platform 103 determines the context information of the user of the UE 101, the UE 101, or a combination thereof, as discussed above. At step 413, the tagging platform 103 determines the state of the criteria based on the context information acquired at step 411. If a second state of the criteria is satisfied, the process 400 proceeds to step 415. If the second state of the criteria is not satisfied, the process 400 reverts back to step 411 and continues determining the context information.

At step 415, the tagging platform 103 terminates the association of the information acquired by the UE 101 with the first tag based on the second state of the criteria being satisfied. By way of example, if the criteria is the same time span discussed above, such as between 1:00 PM and 4:00 PM, a second state of the criteria would be a time after the time span, such as 4:01 PM. Thus, once the current time becomes 4:01 PM, the second state of the criteria is satisfied and the tagging platform 103 terminates the association of the information acquired by the UE 101 with the first tag. Alternatively, at step 415, the tagging platform 103 can determine to initiate an association with the information acquired by the UE 101 with another tag (e.g., a second tag) depending on the number of tags configured for the tagging platform 103 and the number of distinct criteria associated with the tags. By way of example, the tagging platform 103 could be configured to have three different tags that correspond to three different criteria. States of the three criteria can be satisfied at the same time, or not at the same time. For example, the three criteria can all correspond to different spans of time that cannot be satisfied at the same time. Alternatively, the three criteria can correspond to a time, a location, and an elevation that could all be satisfied at the same time. Thus, the process 400 is repeated for all three criteria and all three tags until the states of the three criteria are determined to be in a certain state or until the application 111 used to interface with the tagging platform 103 stops interfacing with the application 111.

Figure 5A:
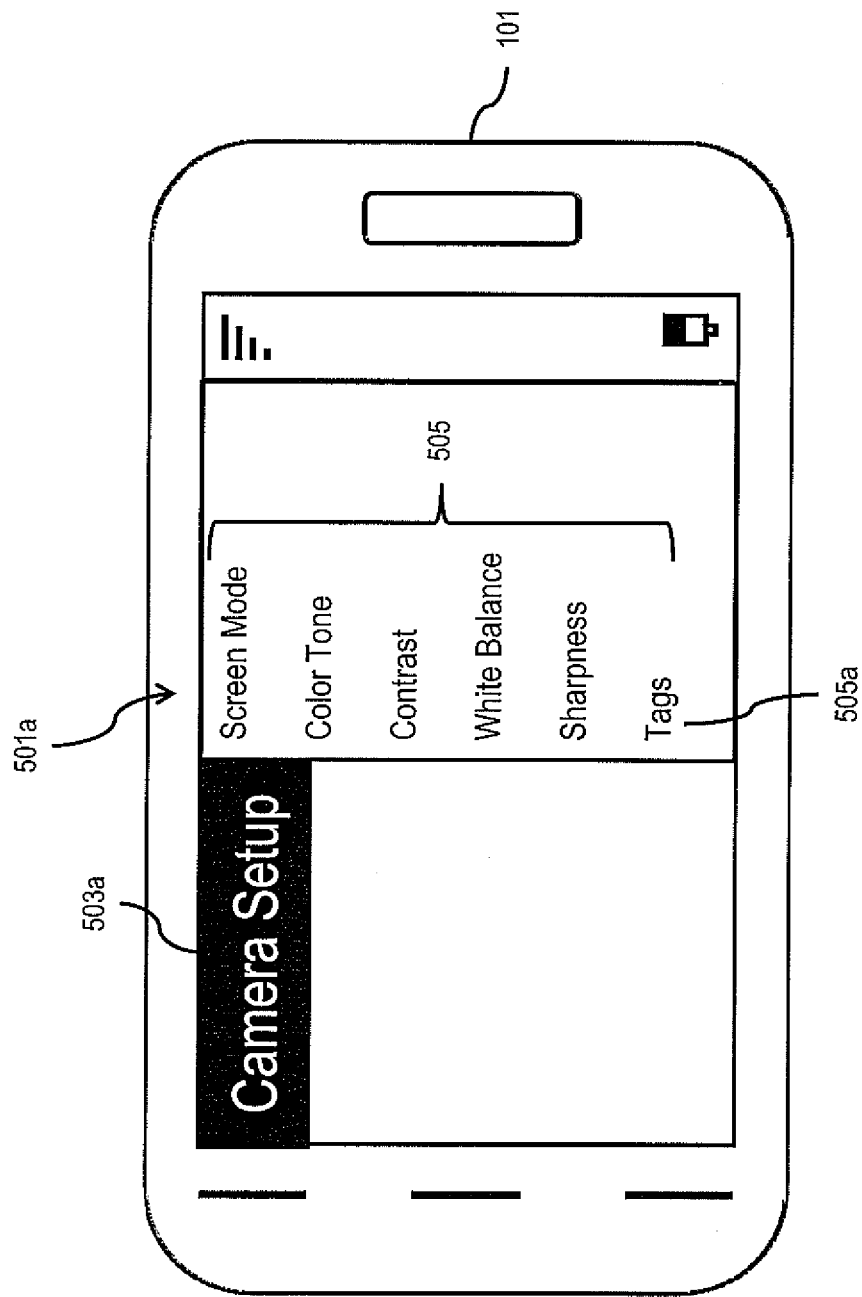
FIGS. 5A-5H are diagrams of user interfaces utilized in the processes of FIGS. 3 and 4, according to various embodiments.

FIGS. 5A-5H are diagrams of user interfaces utilized in the processes of FIGS. 3 and 4, according to various embodiments. FIG. 5A illustrates the user interface 501a of the UE 101 when configuring the tagging function associated with the tagging platform 103. The user interface can be displayed when a user first accesses an application 111 that is used to acquire information, such as a camera application. Alternatively, the user interface 501a can be displayed when the user accesses a setup page associated with the application 111. As illustrated in FIG. 5A, the user interface 501a includes an indicator 503a indicating the UE 101 is in a setup mode for the application. By way of example, the application 111 in FIG. 5A is a camera application. The user interface 501a includes multiple links 505, including a Tags link 505a for setting up the tagging function associated with the tagging platform 103.

Figure 5B:
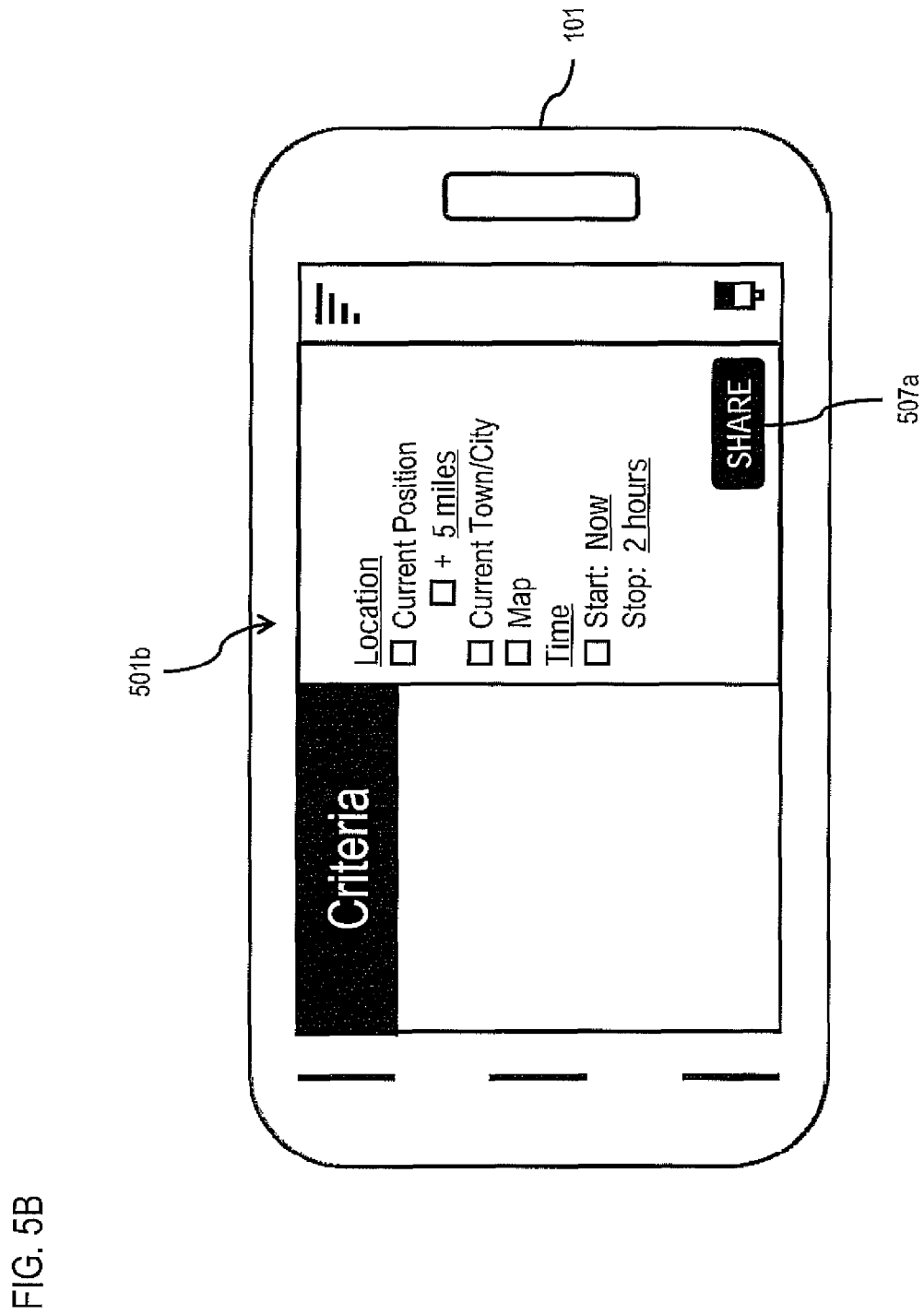

FIG. 5B illustrates the user interface 501b for setting up the criteria associated with the tagging platform 103. The user interface 501b includes two types of criteria—location and time—but the criteria can be any contextual criteria. The location criteria can be, for example, the current location, the location within a set distance from a current location (e.g., 5 miles), or within the current town or city. The location can also be based on a map that allows the user to indicate an area or perimeter on a map. The time criteria can be, for example, a time span defined by a start time (e.g., the current time) and a stop time (e.g., 2 hours). The user interface 501b also includes an indicator 507a labeled "Share" that allows the user of the UE 101 to share the set criteria with another user's UE 101.

Figure 5C:
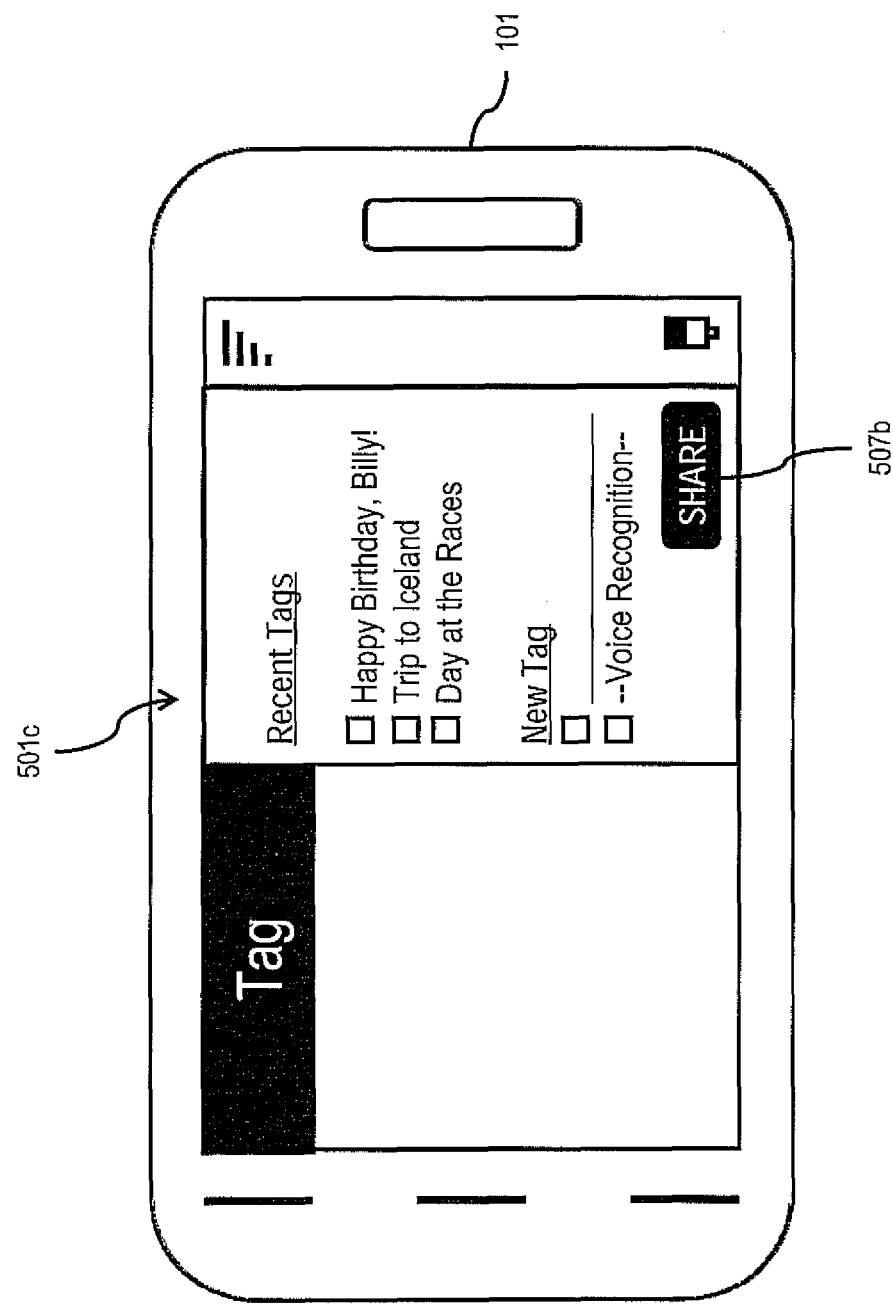

FIG. 5C illustrates the user interface 501c for setting up the tags associated with the tagging platform 103. The user interface 501c includes three saved or recent tags, including "Happy Birthday, Billy!", "Trip to Iceland" and "Day at the Races." The user interface 501c also allows the user to enter new tags according to the illustrated new tag checkboxes. The user interface 501c also allows the user to setup a tag using voice recognition according to conventional voice recognition methods. The user interface 501c also includes indicator 507b that allows the user of the UE 101 to share the set tags with another user's UE 101.

Figure 5D:
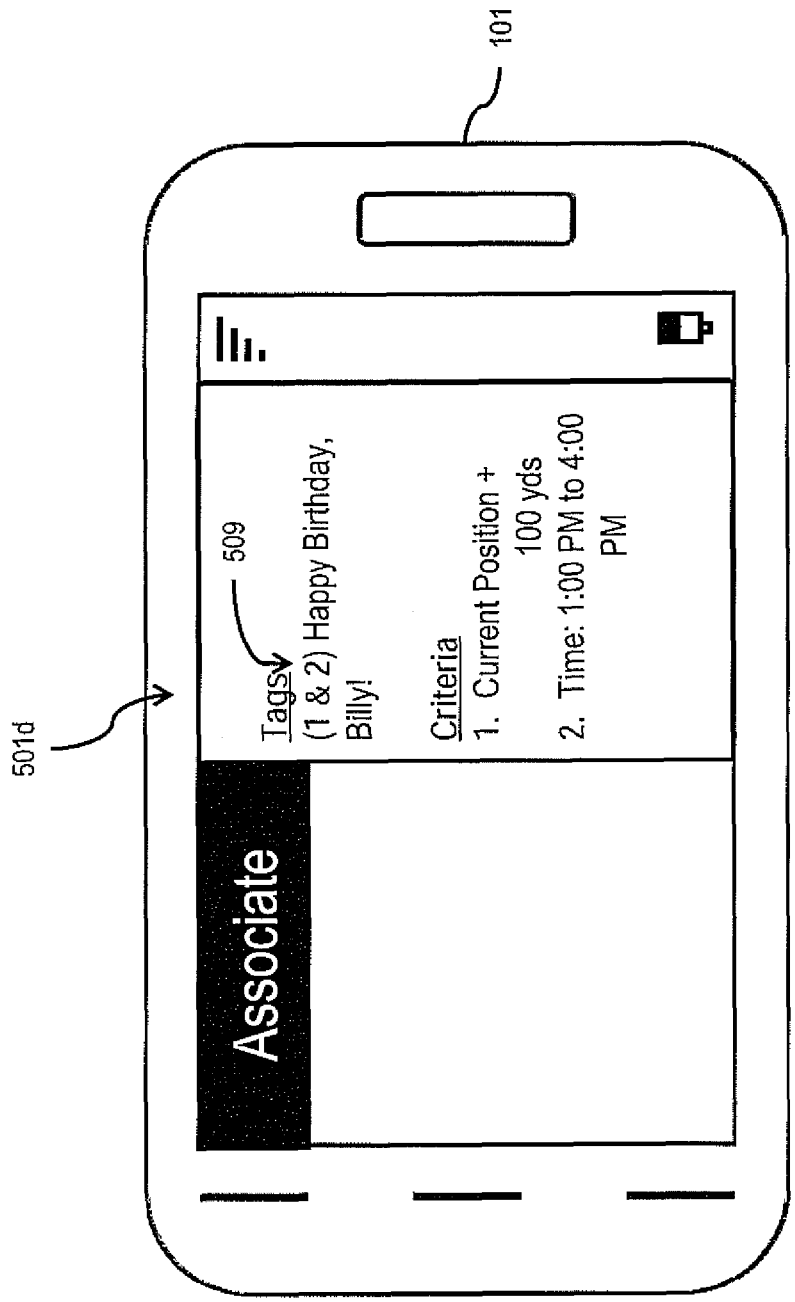

FIG. 5D illustrates the user interface 501d for associating the set tags with the set criteria. The user interface 501d includes one set tag, "Happy Birthday, Billy!" and two set criteria, (1) "Current Position+100 yds" and (2) a time span from 1:00 PM to 4:00 PM. As illustrated by indicator 509, the tag "Happy Birthday, Billy!" is associated with both of the two criteria as indicated by the 1 and 2 next to the set tag.

Figure 5E:
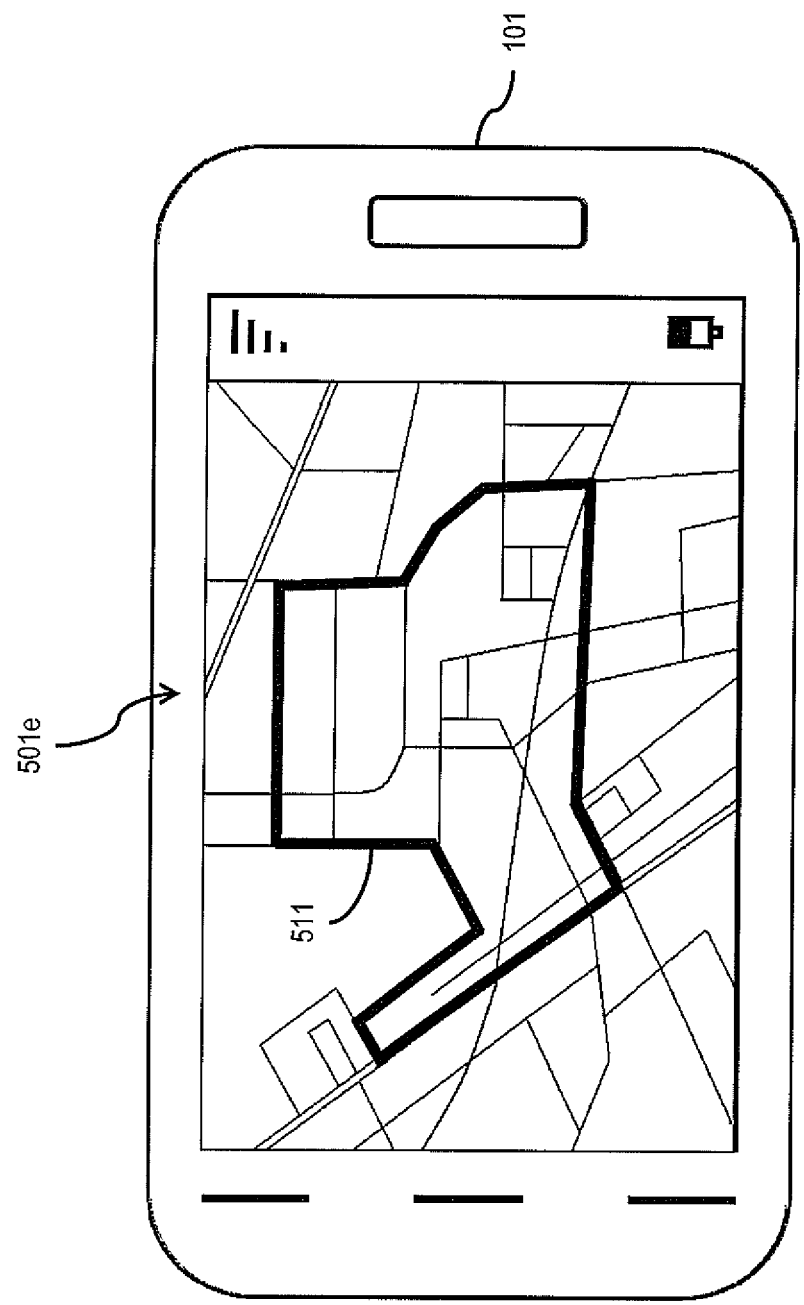
Figure 5F:
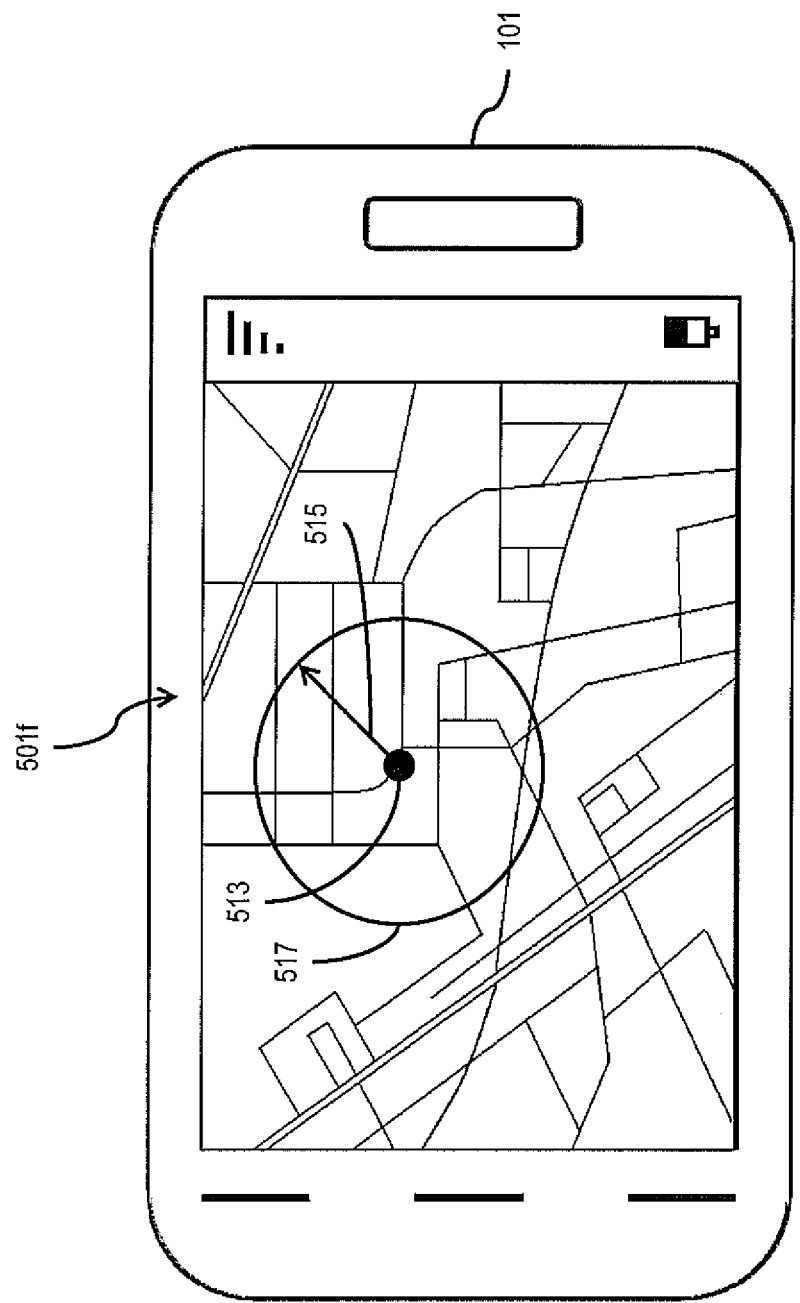
Figure 5G:
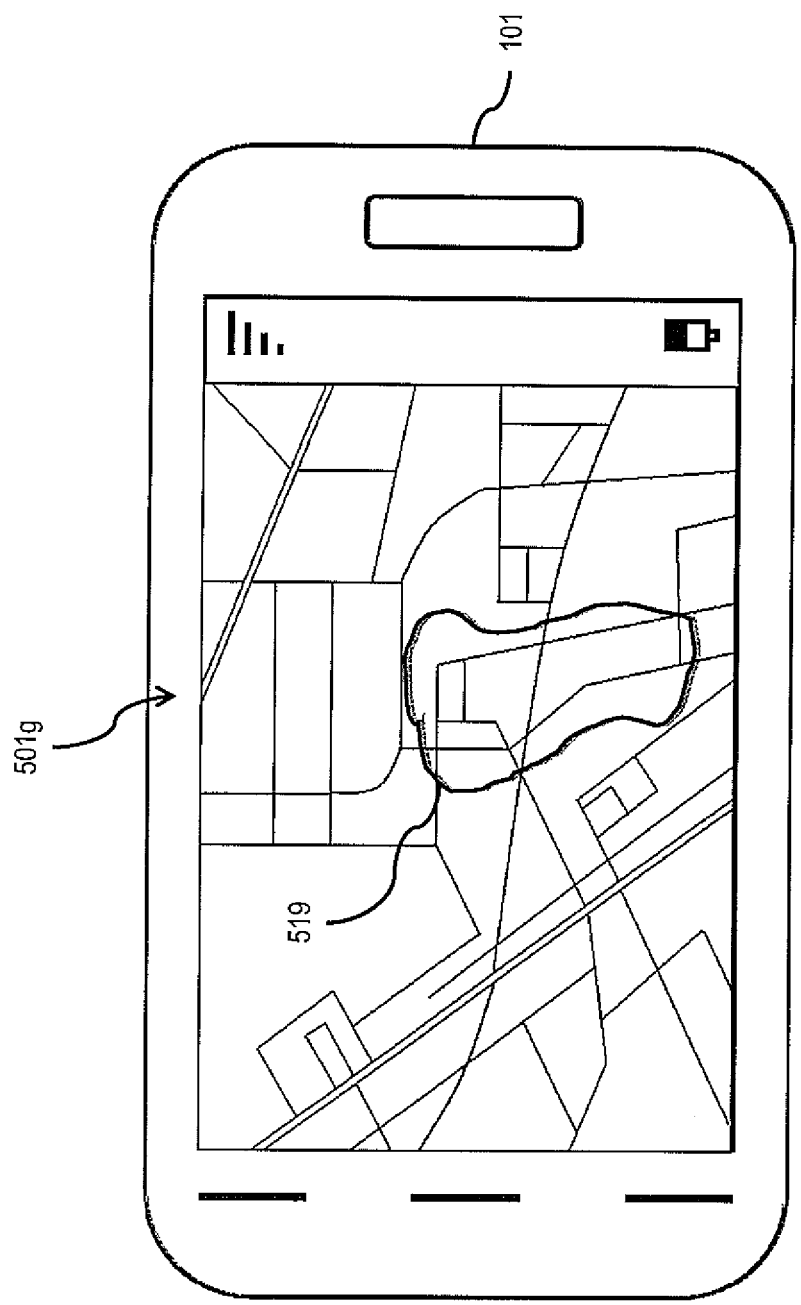

As discussed above, FIGS. 5E-5G illustrate various user interfaces used to select an area for a criteria by drawing an area on a map. In one embodiment, FIG. 5E illustrates a user interface 501e used for selecting an area based on selecting natural boundaries, such as roads, rivers, boarders, etc., to indicate an area corresponding to the criteria. Indicator 511 indicates the perimeter of the area that the user selected as the set criteria based on roads displayed on the map. In one embodiment, FIG. 5F illustrates a user interface 501f used for selecting an area based on a point 513 on the map and a set distance 515 away from the point. Indicator 517 thus illustrates the perimeter of a circular "bubble" area that the user selected as the set criteria. In one embodiment, FIG. 5G illustrates a user interface 501g used for selecting an area based on a freehand drawing of the area. Indicator 519 indicates the perimeter of the hand-drawn area that the user selected as the set criteria.

Figure 5H:
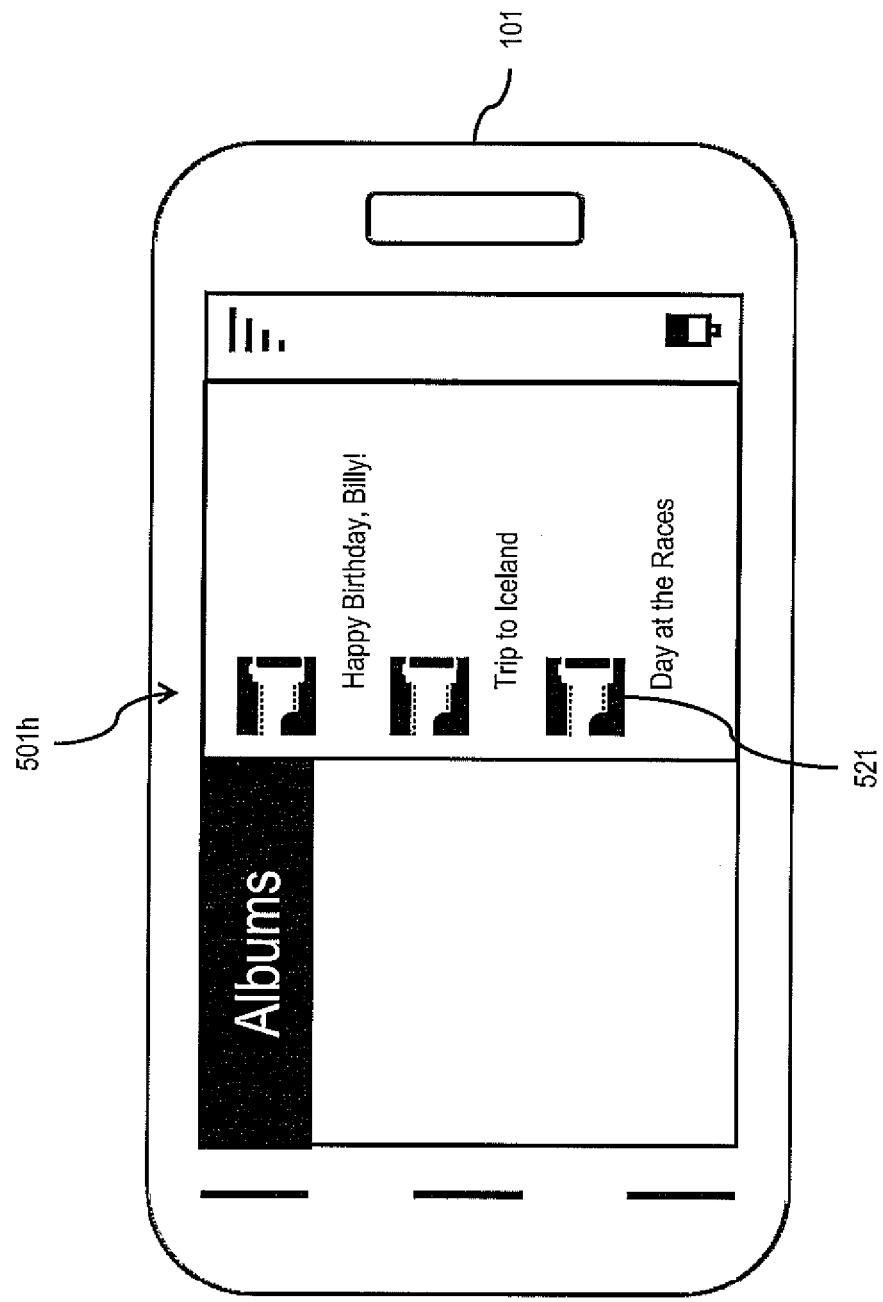

FIG. 5H illustrates a user interface 501h of, for example, a photo album application on the UE 101 where images, acquired using the tags "Happy Birthday, Billy!," "Trip to Iceland" and "Day at the Races," are organized according to their tags in photo albums 521. The tags can be represented by metadata that other applications 111 recognize to automatically sort the acquired information based on the set tags.

The processes described herein for tagging information based on contextual criteria may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 6:
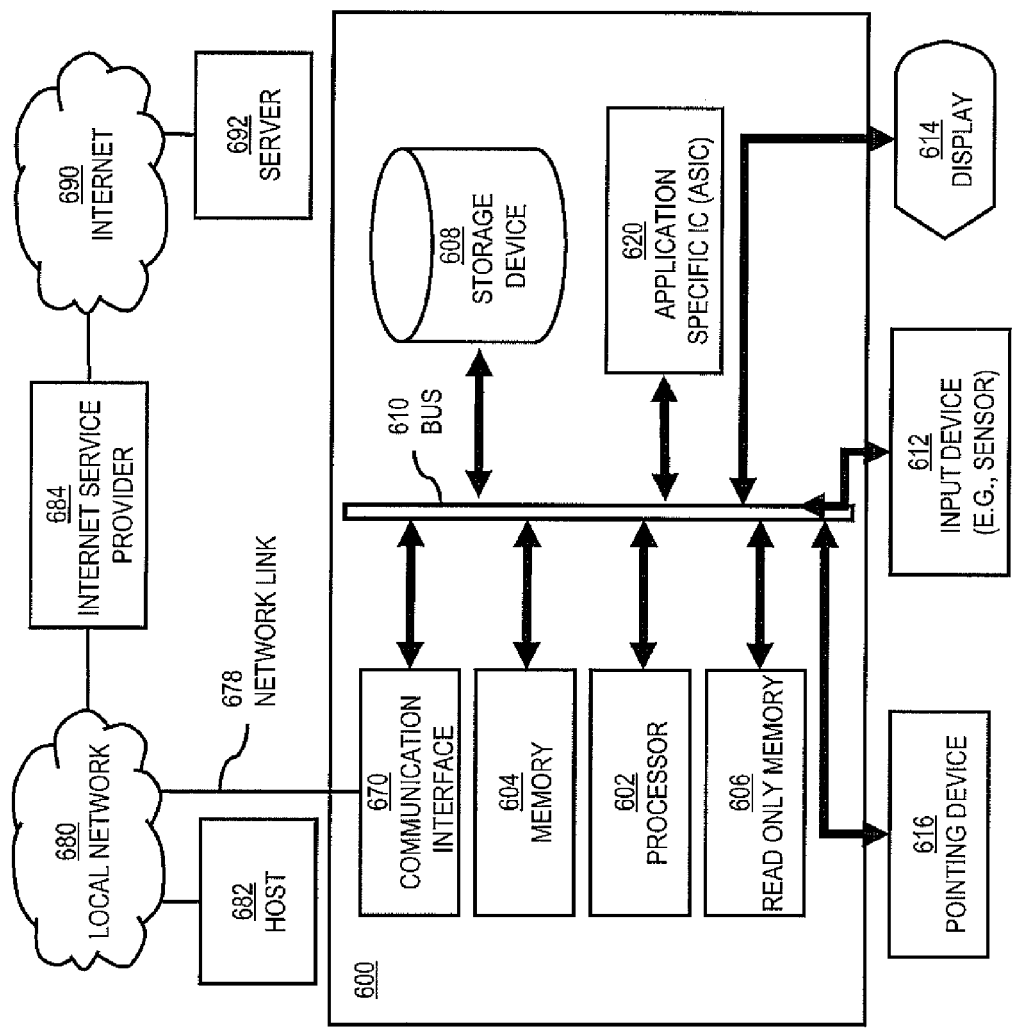
FIG. 6 is a diagram of hardware that can be used to implement an embodiment of the invention.

FIG. 6 illustrates a computer system 600 upon which an embodiment of the invention may be implemented. Although computer system 600 is depicted with respect to a particular device or equipment, it is contemplated that other devices or equipment (e.g., network elements, servers, etc.) within FIG. 6 can deploy the illustrated hardware and components of system 600. Computer system 600 is programmed (e.g., via computer program code or instructions) to tag information based on contextual criteria as described herein and includes a communication mechanism such as a bus 610 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 600, or a portion thereof, constitutes a means for performing one or more steps of tagging information based on contextual criteria.

A bus 610 includes one or more parallel conductors of information so that information is transferred quickly among devices coupled to the bus 610. One or more processors 602 for processing information are coupled with the bus 610.

A processor (or multiple processors) 602 performs a set of operations on information as specified by computer program code related to tagging information based on contextual criteria. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 610 and placing information on the bus 610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 600 also includes a memory 604 coupled to bus 610. The memory 604, such as a random access memory (RAM) or any other dynamic storage device, stores information including processor instructions for tagging information based on contextual criteria. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of processor instructions. The computer system 600 also includes a read only memory (ROM) 606 or any other static storage device coupled to the bus 610 for storing static information, including instructions, that is not changed by the computer system 600. Some memory is composed of volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

Information, including instructions for tagging information based on contextual criteria, is provided to the bus 610 for use by the processor from an external input device 612, such as a keyboard containing alphanumeric keys operated by a human user, a microphone (e.g., voice commands), an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 600. Other external devices coupled to bus 610, used primarily for interacting with humans, include a display device 614, such as a cathode ray tube (CRT), a liquid crystal display (LCD), a light emitting diode (LED) display, an organic LED (OLED) display, a plasma screen, or a printer for presenting text or images, and a pointing device 616, such as a mouse, a trackball, cursor direction keys, or a motion sensor, for controlling a position of a small cursor image presented on the display 614 and issuing commands associated with graphical elements presented on the display 614. In some embodiments, for example, in embodiments in which the computer system 600 performs all functions automatically without human input, one or more of external input device 612, display device 614 and pointing device 616 is omitted.

In the illustrated embodiment, special purpose hardware, such as an application specific integrated circuit (ASIC) 620, is coupled to bus 610. The special purpose hardware is configured to perform operations not performed by processor 602 quickly enough for special purposes. Examples of ASICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a one-way or two-way communication coupling to a variety of external devices that operate with their own processors, such as printers, scanners and external disks. In general the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends or receives or both sends and receives electrical, acoustic or electromagnetic signals, including infrared and optical signals, that carry information streams, such as digital data. For example, in wireless handheld devices, such as mobile telephones like cell phones, the communications interface 670 includes a radio band electromagnetic transmitter and receiver called a radio transceiver. In certain embodiments, the communications interface 670 enables connection to the communication network 105 for tagging information based on contextual criteria to the UE 101.

The term "computer-readable medium" as used herein refers to any medium that participates in providing information to processor 602, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 608. Volatile media include, for example, dynamic memory 604. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 620.

Network link 678 typically provides information communication using transmission media through one or more networks to other devices that use or process the information. For example, network link 678 may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690.

A computer called a server host 692 connected to the Internet hosts a process that provides a service in response to information received over the Internet. For example, server host 692 hosts a process that provides information representing video data for presentation at display 614. It is contemplated that the components of system 600 can be deployed in various configurations within other computer systems, e.g., host 682 and server 692.

At least some embodiments of the invention are related to the use of computer system 600 for implementing some or all of the techniques described herein. According to one embodiment of the invention, those techniques are performed by computer system 600 in response to processor 602 executing one or more sequences of one or more processor instructions contained in memory 604. Such instructions, also called computer instructions, software and program code, may be read into memory 604 from another computer-readable medium such as storage device 608 or network link 678. Execution of the sequences of instructions contained in memory 604 causes processor 602 to perform one or more of the method steps described herein. In alternative embodiments, hardware, such as ASIC 620, may be used in place of or in combination with software to implement the invention. Thus, embodiments of the invention are not limited to any specific combination of hardware and software, unless otherwise explicitly stated herein.

The signals transmitted over network link 678 and other networks through communications interface 670, carry information to and from computer system 600. Computer system 600 can send and receive information, including program code, through the networks 680, 690 among others, through network link 678 and communications interface 670. In an example using the Internet 690, a server host 692 transmits program code for a particular application, requested by a message sent from computer 600, through Internet 690, ISP equipment 684, local network 680 and communications interface 670. The received code may be executed by processor 602 as it is received, or may be stored in memory 604 or in storage device 608 or any other non-volatile storage for later execution, or both. In this manner, computer system 600 may obtain application program code in the form of signals on a carrier wave.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to a signal on an infra-red carrier wave serving as the network link 678. An infrared detector serving as communications interface 670 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602.

FIG. 7 illustrates a chipset or chip 700 upon which an embodiment of the invention may be implemented. Chipset or chip 700 is programmed to tag information based on contextual criteria as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chipset 700 can be implemented in a single chip. It is further contemplated that in certain embodiments the chipset or chip 700 can be implemented as a single "system on a chip." It is further contemplated that in certain embodiments a separate ASIC would not be used, for example, and that all relevant functions as disclosed herein would be performed by a processor or processors. Chipset or chip 700, or a portion thereof, constitutes a means for performing one or more steps of providing user interface navigation information associated with the availability of functions. Chipset or chip 700, or a portion thereof, constitutes a means for performing one or more steps of tagging information based on contextual criteria.

In one embodiment, the chipset or chip 700 includes a communication mechanism such as a bus 701 for passing information among the components of the chipset or chip 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chipset or chip 700 includes merely one or more processors and some software and/or firmware supporting and/or relating to and/or for the one or more processors.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to tag information based on contextual criteria. The memory 705 also stores the data associated with or generated by the execution of the inventive steps.

Figure 8:
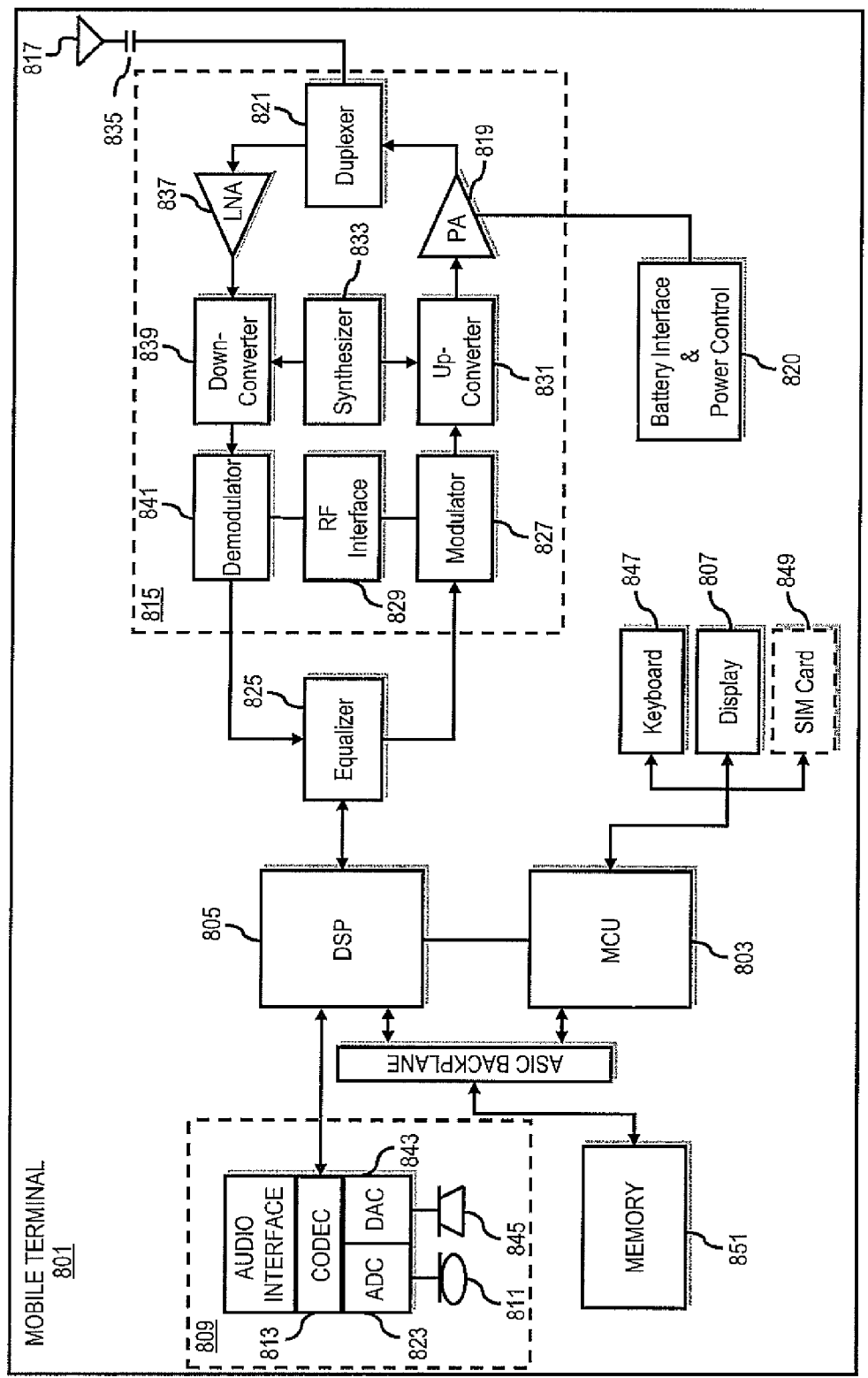
FIG. 8 is a diagram of a mobile terminal (e.g., handset) that can be used to implement an embodiment of the invention.

FIG. 8 is a diagram of exemplary components of a mobile terminal (e.g., handset) for communications, which is capable of operating in the system of FIG. 1, according to one embodiment. In some embodiments, mobile terminal 801, or a portion thereof, constitutes a means for performing one or more steps of tagging information based on contextual criteria. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 803, a Digital Signal Processor (DSP) 805, and a receiver/transmitter unit including a microphone gain control unit and a speaker gain control unit. A main display unit 807 provides a display to the user in support of various applications and mobile terminal functions that perform or support the steps of tagging information based on contextual criteria. The display 807 includes display circuitry configured to display at least a portion of a user interface of the mobile terminal (e.g., mobile telephone). Additionally, the display 807 and display circuitry are configured to facilitate user control of at least some functions of the mobile terminal. An audio function circuitry 809 includes a microphone 811 and microphone amplifier that amplifies the speech signal output from the microphone 811. The amplified speech signal output from the microphone 811 is fed to a coder/decoder (CODEC) 813.

A radio section 815 amplifies power and converts frequency in order to communicate with a base station, which is included in a mobile communication system, via antenna 817. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile terminal 801 speaks into the microphone 811 and his or her voice along with any detected background noise is converted into an analog voltage. The analog voltage is then converted into a digital signal through the Analog to Digital Converter (ADC) 823. The control unit 803 routes the digital signal into the DSP 805 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803 which can be implemented as a Central Processing Unit (CPU).

The MCU 803 receives various signals including input signals from the keyboard 847. The keyboard 847 and/or the MCU 803 in combination with other user input components (e.g., the microphone 811) comprise a user interface circuitry for managing user input. The MCU 803 runs a user interface software to facilitate user control of at least some functions of the mobile terminal 801 to tag information based on contextual criteria. The MCU 803 also delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the terminal. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile terminal 801.

The CODEC 813 includes the ADC 823 and DAC 843. The memory 851 stores various data including call incoming tone data and is capable of storing other data including music data received via, e.g., the global Internet. The software module could reside in RAM memory, flash memory, registers, or any other form of writable storage medium known in the art. The memory device 851 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 849 carries, for instance, important information, such as the cellular phone number, the carrier supplying service, subscription details, and security information. The SIM card 849 serves primarily to identify the mobile terminal 801 on a radio network. The card 849 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   determining, by an apparatus, at least one criteria for associating information being acquired by a mobile device with at least one tag, the at least one criteria includes a user-defined distance from a geographic point of the device, a geographic area hand drawn on the device, or a combination thereof;
   processing, by the apparatus, context information of the device, a user of the device, or a combination thereof to determine a state of the at least one criteria;
   causing, at least in part by the apparatus, an association of the at least one tag with the information based, at least in part, on that the state of the at least one criteria satisfies the user-defined distance, the geographic area, or a combination thereof; and
   causing, at least in part by the apparatus, a transmission of the at least one tag from the mobile device via a network to another mobile device.

2. A method of claim 1, further comprising:
   causing, at least in part by the apparatus, a monitoring of the context information using a global position system receiver built in the device;
   processing, by the apparatus, the monitoring to determine one or more states of the at least one criteria; and
   causing, at least in part by the apparatus, an initiation of the association of the at least one tag with the information based, at least in part, on a first state of the at least one criteria,
   wherein the apparatus is embedded in the mobile device.

3. A method of claim 2, further comprising:
   causing, at least in part, a termination of the association of the at least one tag with the information based, at least in part, on a second state of the at least one criteria.

4. A method according to claim 2, further comprising:
   causing, at least in part, an initiation of an association of at least one other tag with the information based, at least in part, on a second state of the at least one criteria.

5. A method according to claim 2, further comprising:
   causing, at least in part, a determination of at least one other criteria based, at least in part, on a second state of the at least one criteria.

6. A method according to claim 1, further comprising:
   causing, at least in part, a prompt for determining the at least one criteria, the at least one tag, or a combination thereof.

7. A method according to claim 1, further comprising:
   causing, at least in part, a suggestion and/or a pre-selection of the at least one criteria, the at least one tag, or a combination based, at least in part, on the context information.

8. A method according to claim 1, further comprising:
   processing the context information of the device, the user of the device, or the combination thereof to determine the at least one criteria, the at least one tag, or a combination thereof,
   wherein the at least one criteria includes a user-defined time range, and the at least one tag excludes the user-defined time range, the user-defined distance, the geographic area, or a combination thereof.

9. A method according to claim 1, further comprising:
   causing, at least in part by the apparatus, a presentation on the device of the at least one tag representing the information,
   wherein the information comprises one or more images, one or more audio recordings, one or more multimedia recordings, or a combination thereof.

10. A method according to claim 1, wherein the tag includes user-defined metadata, context-defined metadata, default metadata, or a combination thereof.

11. An apparatus comprising:
at least one processor; and
at least one memory including computer program code for one or more programs,
the at least one memory and the computer program code configured to, with the at least one processor, cause the apparatus to perform at least the following,
determine at least one criteria for associating information being acquired by a mobile device with at least one tag, the at least one criteria includes a user-defined distance from a geographic point of the device, a geographic area hand drawn on the device, or a combination thereof;
process context information of the device, a user of the device, or a combination thereof to determine a state of the at least one criteria;
cause, at least in part, an association of the at least one tag with the information based, at least in part, on that the state of the at least one criteria satisfies the user-defined distance, the geographic area, or a combination thereof; and
cause, at least in part, a transmission of the at least one tag from the mobile device via a network to another mobile device.

12. An apparatus of claim 11, wherein the apparatus is further caused to:
cause, at least in part, a monitoring of the context information;
process the monitoring to determine one or more states of the at least one criteria; and
cause, at least in part, an initiation of the association of the at least one tag with the information based, at least in part, on a first state of the at least one criteria.

13. An apparatus of claim 12, wherein the apparatus is further caused to:
cause, at least in part, a termination of the association of the at least one tag with the information based, at least in part, on a second state of the at least one criteria.

14. An apparatus according to claim 12, wherein the apparatus is further caused to:
cause, at least in part, an initiation of an association of at least one other tag with the information based, at least in part, on a second state of the at least one criteria.

15. An apparatus according to claim 12, wherein the apparatus is further caused to:
cause, at least in part, a determination of at least one other criteria based, at least in part, on a second state of the at least one criteria.

16. An apparatus according to claim 11, wherein the apparatus is further caused to:
cause, at least in part, a prompt for determining the at least one criteria, the at least one tag, or a combination thereof.

17. An apparatus according to claim 11, wherein the apparatus is further caused to:
cause, at least in part, a suggestion and/or a pre-selection of the at least one criteria, the at least one tag, or a combination based, at least in part, on the context information.

18. An apparatus according to claim 11, wherein the apparatus is further caused to:
process the context information of the device, the user of the device, or the combination thereof to determine the at least one criteria, the at least one tag, or a combination thereof.

19. An apparatus according to claim 11, wherein the information comprises one or more images, one or more audio recordings, one or more multimedia recordings, or a combination thereof.

20. An apparatus according to claim 11, wherein the tag includes user-defined metadata, context-defined metadata, default metadata, or a combination thereof.

* * * * *